Dec. 1, 1953
W. S. PRAEG
2,660,929
METHOD OF SHAVING GEARS
Filed Jan. 13, 1949
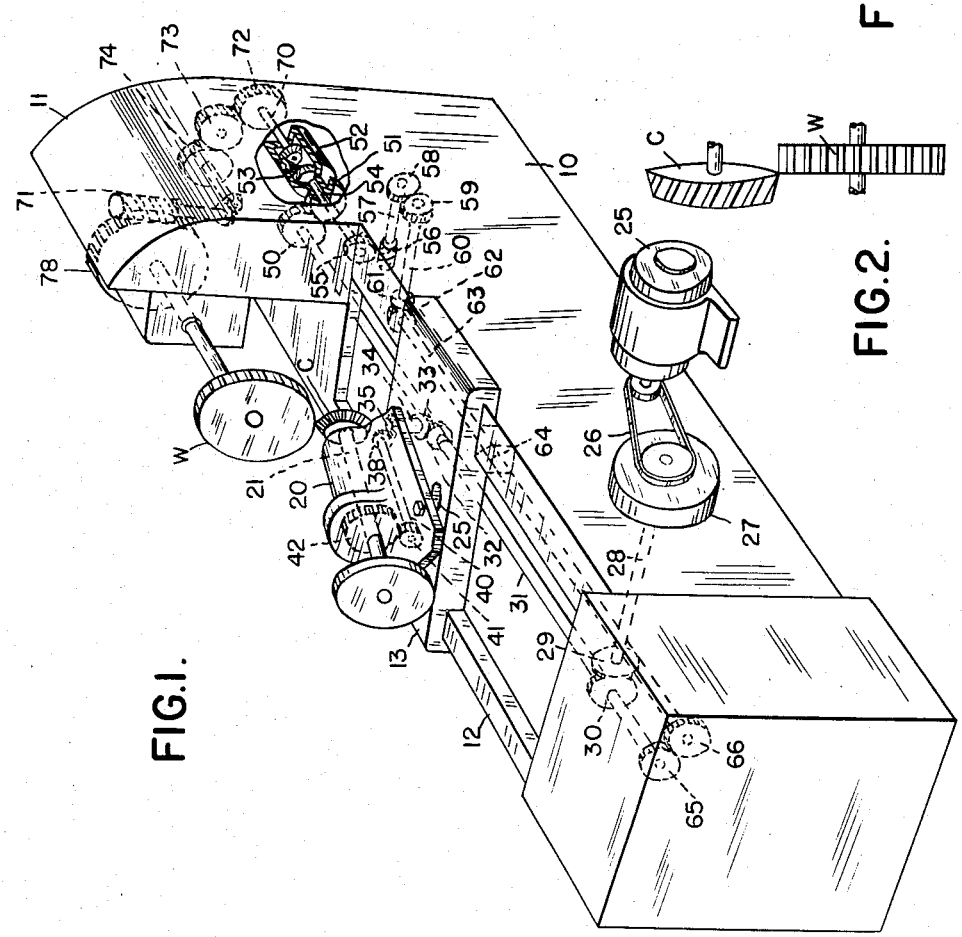
INVENTOR.
WALTER S. PRAEG
BY Whittemore,
Hulbert & Belknap
ATTORNEYS

UNITED STATES PATENT OFFICE 2,660,929

METHOD OF SHAVING GEARS

Walter S. Praeg, Detroit, Mich., assignor to National Broach and Machine Company, Detroit, Mich., a corporation of Michigan Application January 13, 1949, Serial No. 70,678

4 Claims. (Cl. 90—1.6)

The present invention relates to a method of shaving gears.

It is an object of the present invention to provide a method of shaving gears which is characterized by the independent rotation in timed relation of a gear and a gear-like finishing tool with their axes crossed, the tool having cutting edges only at the ends of its teeth, in conjunction with relative traverse between the gear and tool in a direction occupying a plane parallel to the axes of both gear and cutter, in which the gear and cutter are positioned such that clearance exists in back of the cutting edges of the cutter teeth.

Other objects and features of the invention will become apparent as the description proceeds, especially when taken in conjunction with the accompanying drawings, where:

Figure 1 is a perspective view of an apparatus employed in the finishing of gears by the present method;

Figure 2 is a side elevation of a gear and cutter illustrating their relationship during the cutting operation;

Figure 3 is a side elevation of a gear and somewhat different cutter illustrating their relationship during the cutting operation.

The present invention is characterized by the use of a cutting tool in the form of a circular gear, the teeth of the tool having cutting edges at the ends thereof. The cutter is designed to mesh and be conjugate with a circular gear to be finished when the axes of the gear and tool are crossed or angularly disposed with respect to each other. The angle at which the axes of the gear and tool are crossed is preferably less than 30° and excellent results are obtained when the angle of crossed axes is about 10 to 20°. However, in the present method the angle may exceed 30°.

It is desirable to provide cutting clearance in back of the cutting edges on the cutter. This may be accomplished in several ways. In the first place the teeth of the cutter may be relieved so that the tool resembles a shaper cutter. Alternatively the cutter may have teeth which are not relieved and which are uniform from end to end. In this case cutting clearance may be provided by introducing an additional inclination between the gear and cutter so as to provide cutting clearance. Finally, a cutter having unrelieved teeth may be positioned with respect to a gear such that the common normal to the axis of the gear and tool is located a substantial distance ahead of the cutting edges on the cutter teeth. This also introduces effective cutting clearance during the operation.

Referring now to Figure 1 there is illustrated an apparatus for carrying out the present method of gear finishing. This apparatus comprises a frame 10 having a column 11 and a bed 12 constituting ways on which a carriage 13 is mounted for traversing movement. Mounted for vertical adjustment on the column 11 is a slide 15 which carries a gear supporting spindle 16 on which the work gear W is mounted. Carried by the cutter carriage is a support 20 carrying cutter spindle 21 extending at an angle to spindle 16 and on which the cutter C is mounted. Conventional means such as arcuate ways 25 are provided for angular adjustment of support 20 about a vertical axis. In this case both the spindles 16 and 21 are horizontal and the cutter is of the relieved tooth type similar to a conventional gear shaper cutter. Means are provided for independently rotating the spindles 16 and 21 in accurately timed relation. This means is illustrated as comprising an electric motor 25 connected by a belt 26 to a pulley 27 mounted on a cross shaft 28. At the end of the shaft 28 is a bevel gear 29 meshing with a bevel gear 30 mounted on a shaft 31 which extends longitudinally of the machine. The shaft 31 carries a bevel gear 32 which meshes with a bevel gear 33 on a vertical shaft 34, the upper end of which carries a bevel gear 35. The support 20 is mounted for angular adjustment about a vertical axis concentric with the axis of the vertical shaft 34. Mounted on the support 20 is a bevel gear 36 which is adapted to mesh with the bevel gear 35 in all positions of angular adjustment of the support 20. Bevel gear 36 is carried by a shaft 40 on which is also secured a driving gear 41 which meshes with gear 42 keyed or otherwise secured to the cutter spindle 21.

The longitudinally extending shaft 31 at its opposite end carries a gear 50 meshing with a gear 51 connected to a differential housing 52. Located within the housing 52 is a planetary gear set indicated generally at 53, one of which is driven from a shaft 54 which carries a worm gear 55. The worm gear 55 is driven from a worm 56 carried by a shaft 57 which also carries a gear 58. The gear 58 in turn is driven by gear 59 carried by shaft 60 which also carries a bevel gear 61. The bevel gear 61 meshes with a bevel gear 62 mounted on a screw shaft 63, the shaft 63 having a threaded portion engaging a feed nut indicated generally at 64. The shaft 63 is rotated from the prime source of power and specifically from the shaft 31 through gears 65 and 66, the gear 66 being keyed or otherwise secured to the shaft 63.

The arrangement is such that the work spindle 16 and the cutter spindle 21 are rotated in accurately timed rotation independently of traverse of the carriage 13, this being accomplished through the differential previously referred to.

The differential drives a shaft 70 which in turn drives a worm 71 through the medium of gears 72, 73, 74 and bevel gears 75 and 76. The worm 71 meshes with the worm wheel 78 keyed or otherwise secured to the work spindle 16.

Carrying out the operation the cutter is angularly adjusted to the proper position to mesh with the teeth of the work gear W and is located so that the common normal to the axis of the gear and cutter is at or outside the face of the gear at which the cut is to be initiated as illustrated in Figure 2. At the same time the common normal to the axis of the gear and cutter is located substantially in the plane of the cutting teeth of the cutter. The gear and cutter are rotated at relatively high speed so as to obtain a peripheral surface speed of the gear and cutter on the order of several hundred feet a minute. Traverse effected through the feed screw 63 and the feed nut 64 is relatively slow on the order of a few thousandths of an inch per revolution of the work gear. The teeth of the gear W are finished in a single pass. Preferably means are provided for effecting a relieving movement between the cutter and the gear upon completion of the stroke followed by a rapid return of the carriage 13 to initial position.

Instead of employing a relieved cutter of the shaper cutter type, it will be appreciated that equivalent results may be obtained if a cutter having unrelieved teeth is employed and if the cutter spindle is additionally inclined so as to provide cutting clearance. This arrangement is illustrated in Figure 3 in which the cutter spindle is illustrated as inclined to the horizontal through an angle indicated at A so as to provide cutting clearance. As will be readily apparent this may be accomplished in the machine illustrated in Figure 1 by the simple expedient of appropriately inclining the adjustable support 20. Specifically this would be accomplished by raising the right hand end of the support 20 as seen in this figure.

Alternatively a cutter having unrelieved teeth similar to the cutter C' indicated in Figure 3 may be employed without the angular inclination indicated by the angle A if it is mounted so that the cutting ends of the teeth are spaced a substantial distance away from the common normal to the axis of the gear and cutter. In the machine illustrated in Figure 1 this would call for setting the cutter C' to the left on the cutter spindle 21, which in turn would result in the cut being taken somewhat to the left of the bottom portion of the work gear W.

The drawings and the foregoing specification constitute a description of the improved method of shaving gears in such full, clear, concise and exact terms as to enable any person skilled in the art to practice the invention, the scope of which is indicated by the appended claims.

What I claim as my invention is:

1. The method of finishing a gear of cylindrical form which comprises meshing it in tight mesh with a gear-like cutter of cylindrical form having teeth provided with cutting edges at the ends thereof, with the axes of said gear and cutter crossed to produce a substantial relative motion between the gear and cutter endwise of the teeth thereof, said cutter teeth being uniform from end to end, said cutter being additionally inclined with respect to said gear so as to introduce cutting clearance in back of the cutting edges, rotating said gear and cutter independently in accurately timed relation at cutting speeds, and effecting a slow relative traverse between the gear and cutter in a direction parallel to the axis of the gear to distribute the finishing cut of the cutter from end to end of the gear teeth.

2. The method of finishing a gear of cylindrical form which comprises meshing the gear in tight mesh with a gear-like cylindrical cutter with the axes of the gear and cutter crossed at an angle of less than 30°, the corresponding ends of the teeth of the cutter forming cutting edges, the teeth of said cutter being unrelieved in back of said cutting edges, the cutter being located with the common normal to the axes of the gear and tool spaced outwardly from the plane of its side containing the cutting edges, rotating said gear and cutter independently at cutting speeds in accurately timed relation, and effecting a slow relative traverse between the gear and cutter in the direction of the axis of the gear.

3. A method of shaving a gear employing a gear-like tool having teeth of uniform cross-section and provided with cutting edges only at the ends of its teeth, which comprises tightly meshing the gear and cutter with their axes crossed at an angle of less than 30 degrees, and both of said axes being parallel to a reference plane, the common normal to the axes being located outwardly beyond the side of the tool at which the teeth are provided with cutting edges, driving the gear and tool independently in accurately timed relation at cutting speeds, and effecting relative traverse at feeding speeds between the gear and tool to extend the cut from end to end of the gear teeth.

4. The method of finishing a gear of cylindrical form which comprises meshing the gear in tight mesh with a gear-like cylindrical cutter with the axes of the gear and cutter crossed at an angle of less than 30 degrees, the corresponding ends of the teeth of the cutter forming cutting edges, the teeth of said cutter being unrelieved in back of said cutting edges, the cutter being positioned to provide clearance directly in back of said cutting edges, rotating said gear and cutter independently at cutting speeds in accurately timed relation, and effecting a slow relative traverse between the gear and cutter in the direction of the axis of the gear.

WALTER S. PRAEG.

References Cited in the file of this patent

UNITED STATES PATENTS

| Number | Name | Date |
| --- | --- | --- |
| 2,157,981 | Drummond | May 9, 1939 |
| 2,282,193 | Lambrix | May 5, 1942 |
| 2,318,179 | Mentley | May 4, 1943 |
| 2,372,444 | Mentley | Mar. 27, 1945 |
| 2,484,482 | Austin | Oct. 11, 1949 |
| 2,499,167 | Sanborn | Feb. 28, 1950 |

FOREIGN PATENTS

| Number | Country | Date |
| --- | --- | --- |
| 698,881 | Germany | Nov. 19, 1940 |